United States Patent [19]
Packard et al.

[11] Patent Number: 6,035,834
[45] Date of Patent: Mar. 14, 2000

[54] NITROGEN OXIDES REDUCING AFTERCOOLER FOR TURBOCHARGED ENGINES

[75] Inventors: Charles J. Packard, Charlottesville; Peter Moliterno, Richmond, both of Va.

[73] Assignee: Industrial Power Generating Corporation, Rockville, Va.

[21] Appl. No.: 08/798,221

[22] Filed: Feb. 10, 1997

[51] Int. Cl.[7] .......................... F02B 29/04; F02M 25/028
[52] U.S. Cl. .......................... 123/563; 96/311; 123/25 A; 123/25 G
[58] Field of Search ................. 60/599; 96/237, 96/239, 306, 309, 311, 360; 123/25 A, 25 G, 563

[56] References Cited

U.S. PATENT DOCUMENTS

| | | |
|---|---|---|
| 160,215 | 2/1875 | Maxim ................................ 96/311 |
| 1,345,681 | 7/1920 | Kratochvil ........................ 123/25 G |
| 1,708,587 | 4/1929 | Patterson ......................... 123/25 G |
| 1,854,607 | 4/1932 | Andrews .......................... 123/25 G |
| 2,258,088 | 10/1941 | Dunn ................................ 123/25 G |
| 3,561,194 | 2/1971 | Baldwin et al. . | 
| 3,801,696 | 4/1974 | Mark . |
| 3,803,813 | 4/1974 | Yuzawa . |
| 4,300,924 | 11/1981 | Coyle . |
| 5,175,998 | 1/1993 | Simuni . |
| 5,180,406 | 1/1993 | Shih . |
| 5,189,878 | 3/1993 | Robinson et al. . |
| 5,809,981 | 9/1998 | Berg-Sonne ...................... 123/563 |

FOREIGN PATENT DOCUMENTS 2446490  5/1976  Germany ............................ 60/599

*Primary Examiner*—Michael Koczo
*Attorney, Agent, or Firm*—J. Michael Martinez de Andino; McGuire, Woods, Battle & Boothe LLP

[57] ABSTRACT

An aftercooler apparatus that is connected to a turbocharger and to a reciprocating engine has a primary and a secondary saturation chamber, and a drying chamber. Turbocharged air from the turbocharger is directed into the primary saturation chamber. The incoming air is initially mixed with and cooled by water located at the bottom of the primary saturation chamber before being directed through a diffusion screen. The air exiting the diffusion screen enters the secondary saturation chamber where intense bubbling and foaming increases the air-water contact area to further cool the air and form an air-water mixture approaching the temperature and moisture level of saturation. The air-water mixture is then directed into the drying chamber where a majority of the moisture is removed from the air through the use of centrifugal force. The now cooler moist air is directed toward the engine intake manifold, whereby the moisture in the air stream acts to reduce the NOx formation during the combustion process. The aftercooler apparatus acts to reduce the formation of NOx emissions from turbocharged engines rather than attempting to remove the NOx emissions from the exhaust stream of the engines. The aftercooler apparatus may also be used to beneficially recycle industrial waste waters.

21 Claims, 6 Drawing Sheets

NITROGEN OXIDES REDUCING AFTERCOOLER FOR TURBOCHARGED ENGINES

TECHNICAL FIELD

The present invention relates to an apparatus for reducing the formation of nitrogen oxides. More precisely, it relates to an apparatus for reducing the formation of nitrogen oxides from turbocharged engines and from systems employing exhaust gas recirculation.

BACKGROUND OF THE INVENTION

There are apparatus' for reducing nitrogen oxides (NOx) from exhaust gases, but these apparatus' have normally been limited to the use of water injection systems for reducing NOx emission from the exhaust gases of combustion engines. Water injection systems in reciprocating engines have been used for increasing power and internal cooling, but not directly for reducing the formation of NOx.

Exhaust gas recirculation (EGR) has been used as a NOx reduction technique in reciprocating engines, but its use has been limited in diesel engines which are turbocharged and aftercooled, because normal engine aftercoolers are typically small finned core heat exchangers. The small air spaces in these heat exchangers are quickly fouled by soot which all diesel engines emit, even if only for startup. Accordingly, there is a need for an aftercooler apparatus that would solve the traditional aftercooler fouling problem seen with EGR systems while also cooling the intake air and reducing the formation of NOx emission levels.

Further, the presently used NOx reducing devices remove gaseous or particulate matter from the exhaust stream of an engine or apparatus through the use of chemical reagents, activated carbon filter elements or exhaust gas conditioners. There is a need for a NOx reducing apparatus that reduces the formation of NOx in the engine by treating the intake air to the engine, thereby also affecting the combustion process and eliminating the need to remove the sediment formation from NOx reducing after treatment type devices due to the concentration of soot or other such contaminants.

In order to overcome the above-mentioned defects in the previously known methods and apparatus' for reducing the NOx emissions from turbocharged engines, there is a need for an apparatus for reducing NOx emissions from turbocharged engines that acts on the intake air of the engine, not the exhaust gases, and that reduces the formation of NOx rather than removing it from the exhaust stream of the engine. There is also a need for an apparatus for reducing NOx emissions from turbocharged engines that does not require the removal of concentrated pollutants from the treatment device and which allows for the removal of traditional engine aftercooler devices thereby reducing air flow restriction and increasing fuel economy. There is also a need for an apparatus for reducing NOx emissions that uses water as a coolant without requiring the cooling water to be treated for the removal of dissolved solids in the water prior to using the water as a coolant. The apparatus of the present invention meeting these requirements is described in more detail below.

SUMMARY OF THE INVENTION

In accordance with the present invention, the disadvantages of the prior methods and apparatus' for reducing NOx emissions from the exhaust of engines has been overcome. The apparatus of the present invention is environmentally safe, increases fuel economy, eliminates the requirement of removing concentrated pollutants produced from combustion and lowers exhaust temperature which leads to increased engine life.

According to the present invention, the apparatus consists of an aftercooler device that is connected to an engine turbocharger and to a reciprocating engine. Turbocharged air from the turbocharger is directed into the aftercooler through an inlet tube into the aftercooler's primary saturation chamber. The incoming air is initially mixed with and cooled by the water located at the bottom of the primary saturation chamber before being divided and directed toward and through a diffusion screen. The air exiting the diffusion screen enters a secondary saturation chamber where intense bubbling and foaming increases the air-water contact area that further cools the air and results in an air-water mixture approaching the temperature and moisture level of saturation.

The cooler and saturated air is then moved through a tangential outlet into a primary drying chamber where a majority of the moisture is removed from the air through the use of centrifugal force. The air is then directed toward an outlet tube that forces the air to make an abrupt 180 degree turn thereby assisting in removing any unevaporated water not separated from the air stream. The now cooler moist air is directed toward the engine intake manifold, whereby the moisture in the air stream acts to reduce the NOx formation during the combustion process. The exhaust gas from the engine is collected in the exhaust manifold and directed toward the turbine wheel in the turbocharger, which uses the energy in the exhaust stream to drive the turbocharger's compressor.

Accordingly, it is the primary object of the present invention to provide an apparatus the reduces the formation of NOx emissions from turbocharged engines rather than removing NOx emissions from the exhaust stream of the engines.

It is a further object of the present invention to provide an apparatus for reducing NOx emissions from turbocharged engines that does not require the removal of concentrated pollutants from the treatment device and which allows for the removal of traditional engine aftercooler devices thereby reducing air flow restriction and increasing fuel economy.

It is another object of the present invention to provide an apparatus for reducing NOx emissions from turbocharged engines that acts on the intake air of the engines, not the exhaust gases, and that reduces the formation of NOx emissions rather than removing these emissions from the exhaust stream of the engines.

It is a further object of the present invention to provide an apparatus for reducing the NOx emissions from engines that uses water as a coolant without requiring the cooling water to be treated for the removal of dissolved solids in the water prior to using the water as a coolant. Other objects and advantages of this invention will become apparent from the following description wherein is set forth, by way of illustration and example, certain embodiments of this invention.

DETAILED DESCRIPTION OF THE PREFERRED EMBODIMENTS

Figure 1:
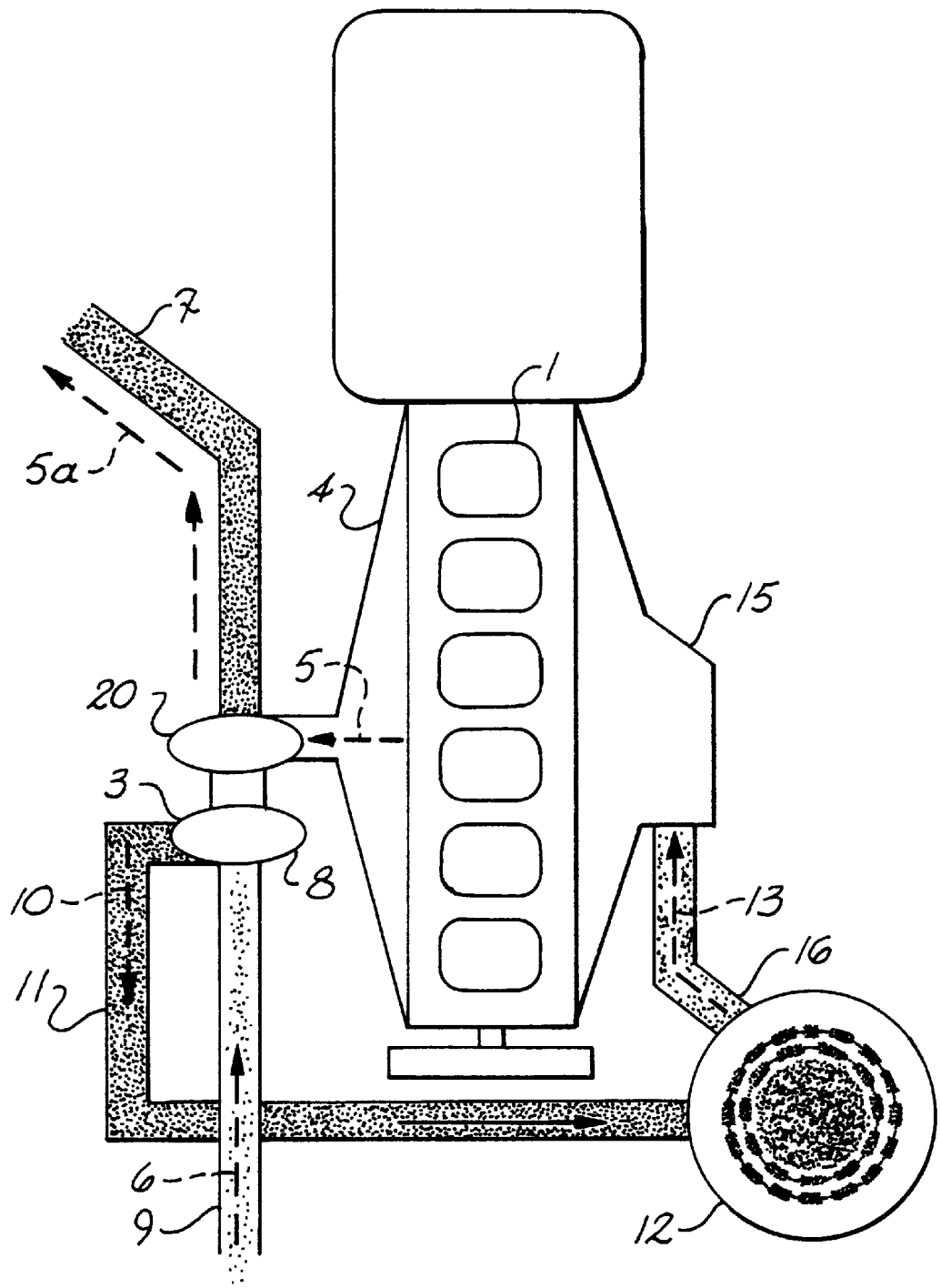
FIG. 1 is a perspective view of a turbocharged engine system using the apparatus.
Figure 2:
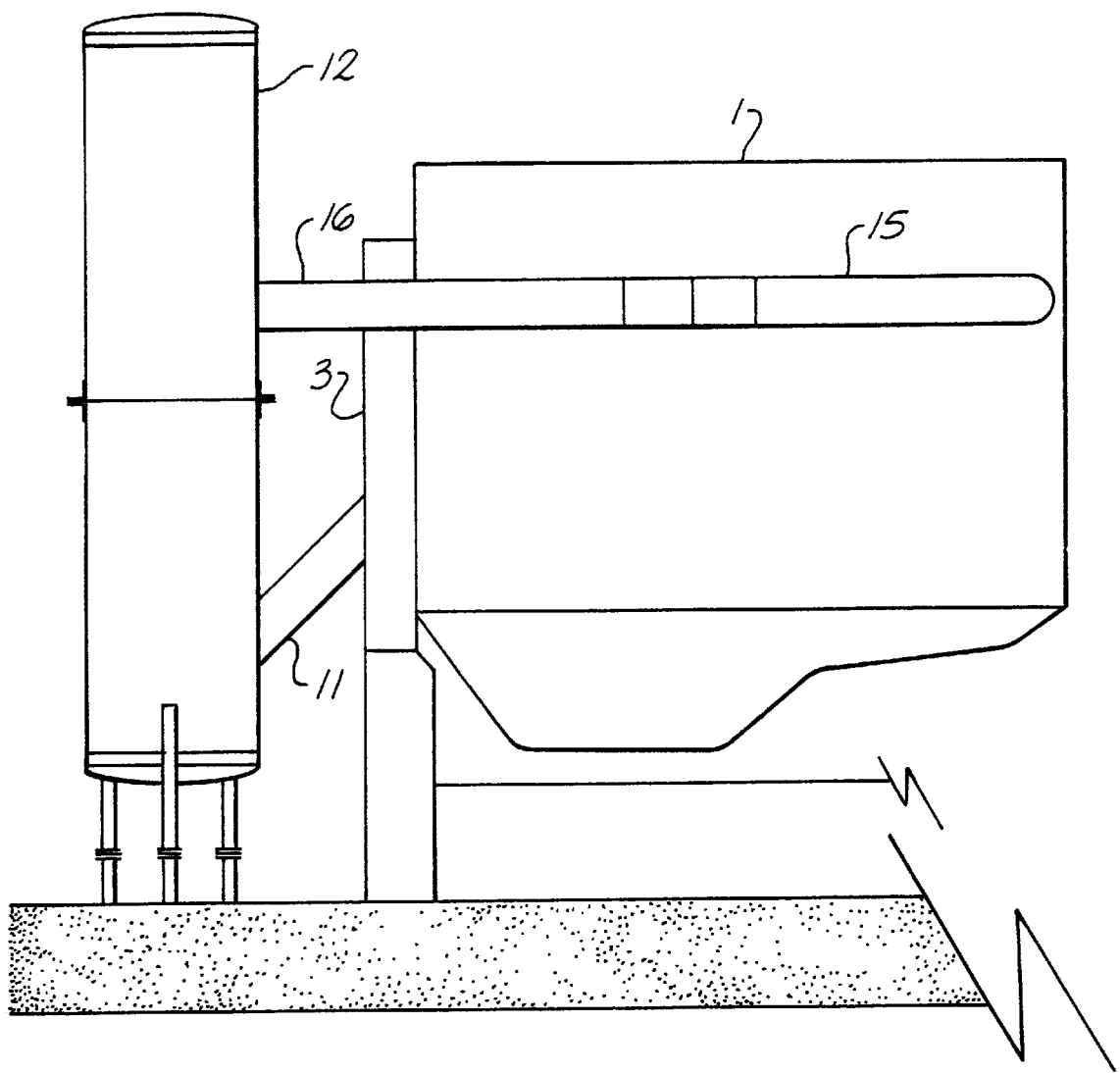
FIG. 2 is an elevational right side view of the turbocharged engine system depicted in FIG. 1.
Figure 3:
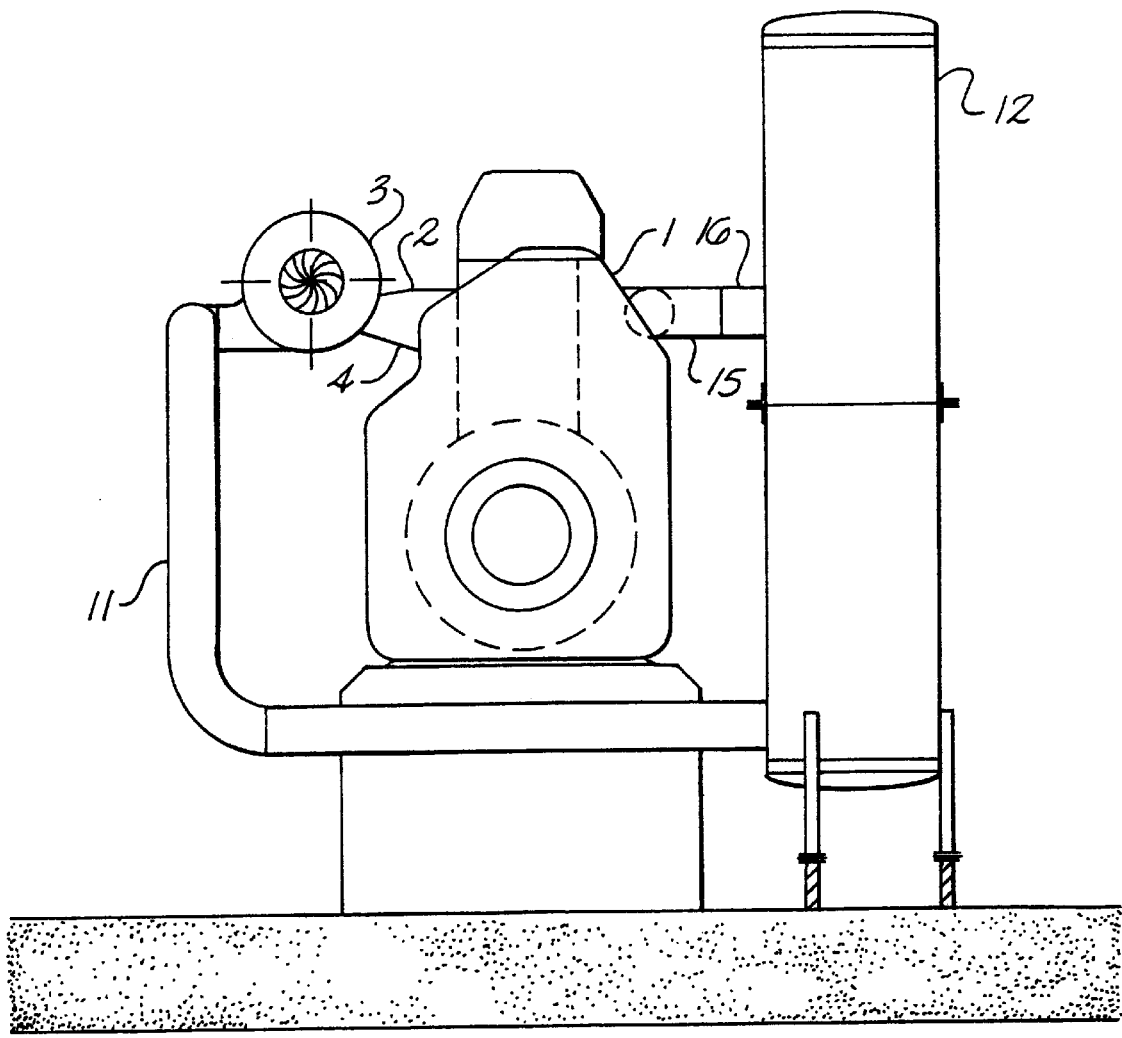
FIG. 3 is an elevational front view of the turbocharged engine system depicted in FIG. 1.
Figure 4:
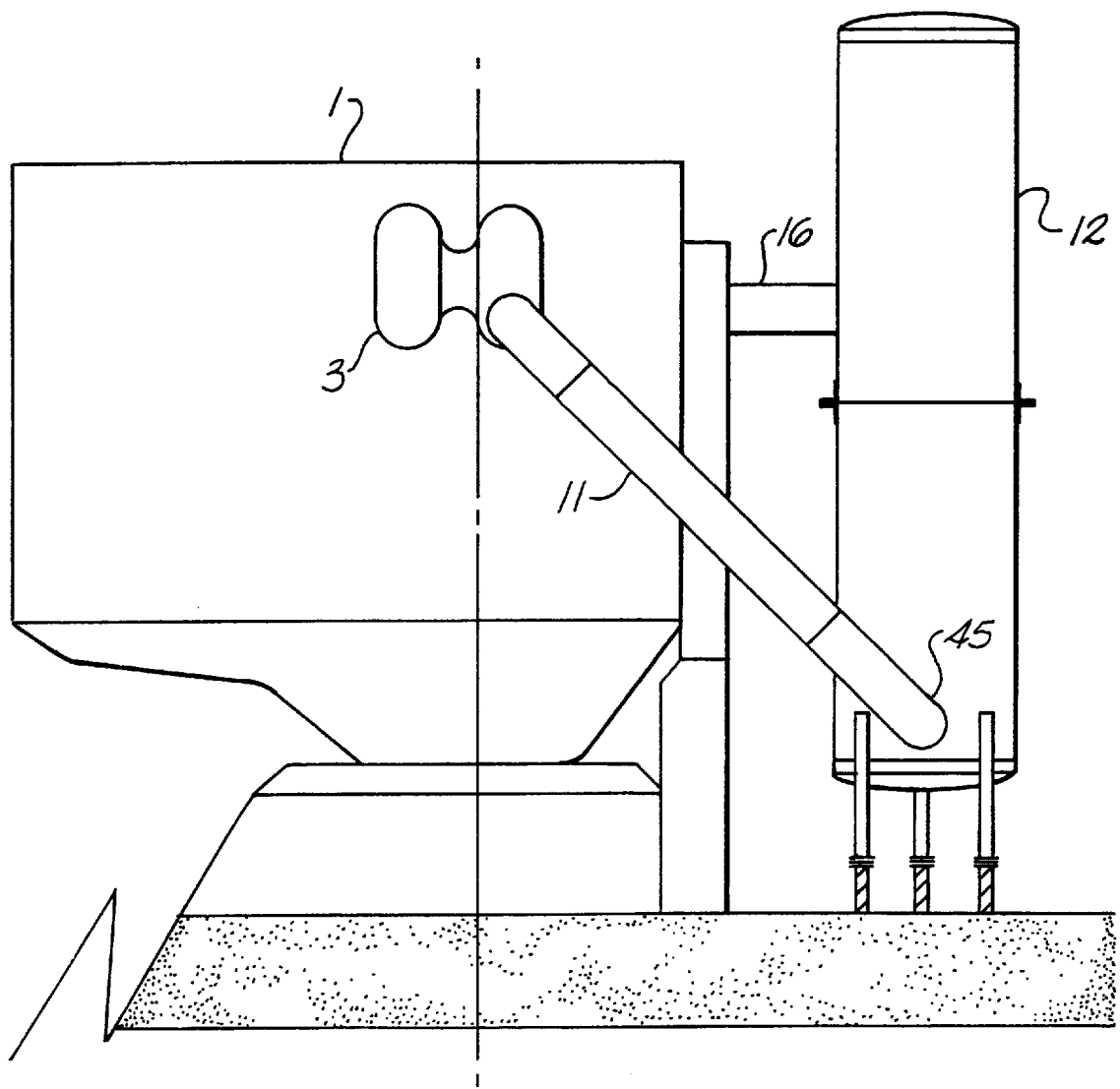
FIG. 4 is an elevational left side view of the turbocharged engine system depicted in FIG. 1.

Referring now to the drawings, a typical embodiment of the invention is shown in FIGS. 1–6. Before the present invention is described, however, it is to be understood that this invention is not limited to a particular or specific description. It is also to be understood that the terminology used herein is for the purpose of describing particular embodiments only, and is not intended to be limiting, as the scope of the present invention will be limited only by the appended claims. Further, unless defined otherwise, all terms used herein have the same meaning as commonly understood by one of ordinary skill in the art to which this invention belongs.

Referring to FIGS. 1–4, a reciprocating engine 1 is shown connected to the engine turbocharger 3 through the engine's exhaust manifold 4. The engine 1 produces high temperature exhaust gas 5. The turbocharger 3 has an exhaust pipe 7 that allows for a lower temperature exhaust gas 5a to leave the turbocharger 3. The turbocharger 3 also has a compressor 8 that compresses filtered air 6 having an ambient temperature. The filtered air 6 is drawn into the compressor 8 through an inlet tube 9 and is then discharged as compressed, heated air 10. The compressed, heated air 10 is directed through a discharge tube 11 to a NOx reducing aftercooler 12.

The aftercooler 12 humidifies and cools the incoming compressed heated air 10 by direct water contact. The now moist air is directed as an air stream 13 to the engine 1 through an engine intake manifold 15 by an air tube 16. Inside the engine 1 the moisture in the air stream 13 acts to reduce the formation of NOx emissions during the combustion process in the engine 1. The exhaust gas 5 from the engine 1 is collected in the exhaust manifold 4 and is directed to the turbine wheel 20 of the turbocharger 3. The turbocharger 3 uses the energy in the exhaust gas 5 to drive the turbine wheel 20, which results in the exhaust gas 5a having a lower temperature. The turbocharger 3 then discharges the lower temperature exhaust gas 5a out into the atmosphere through the exhaust pipe 7.

Through the use of the aftercooler 12, which treats the filtered air 6 that is compressed and directed to the aftercooler 12 and which becomes the intake air (the air stream 13) of the engine 1, the formation of NOx emissions is reduced. The aftercooler 12 thereby provides for a more efficient method of reducing NOx emissions by reducing the formation of NOx during the combustion process versus attempting to remove these emissions from the exhaust gases 5 after being formed in the combustion process in an engine.

Figure 5:
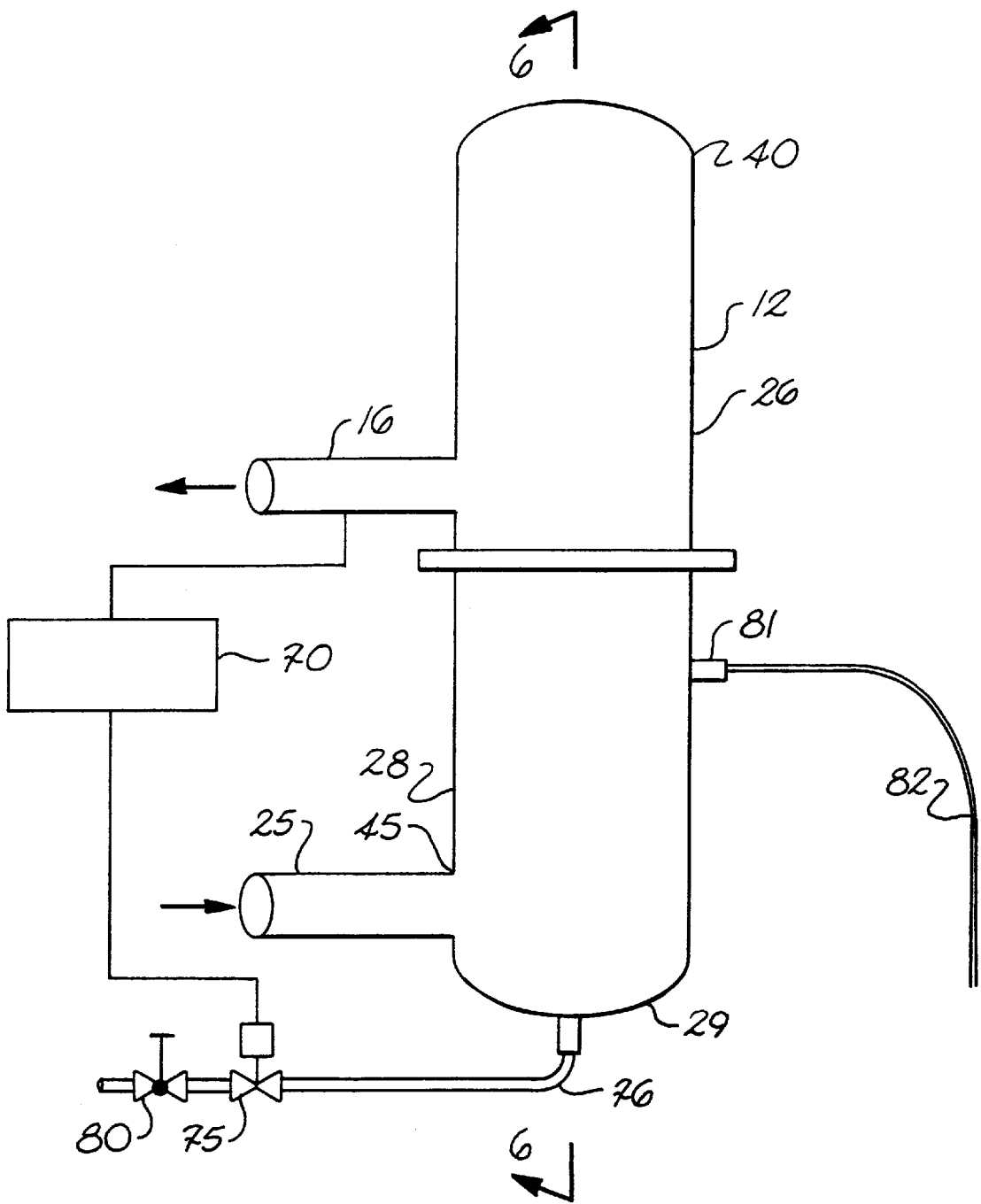
FIG. 5 is a perspective view of the apparatus shown in FIG. 1.
Figure 6:
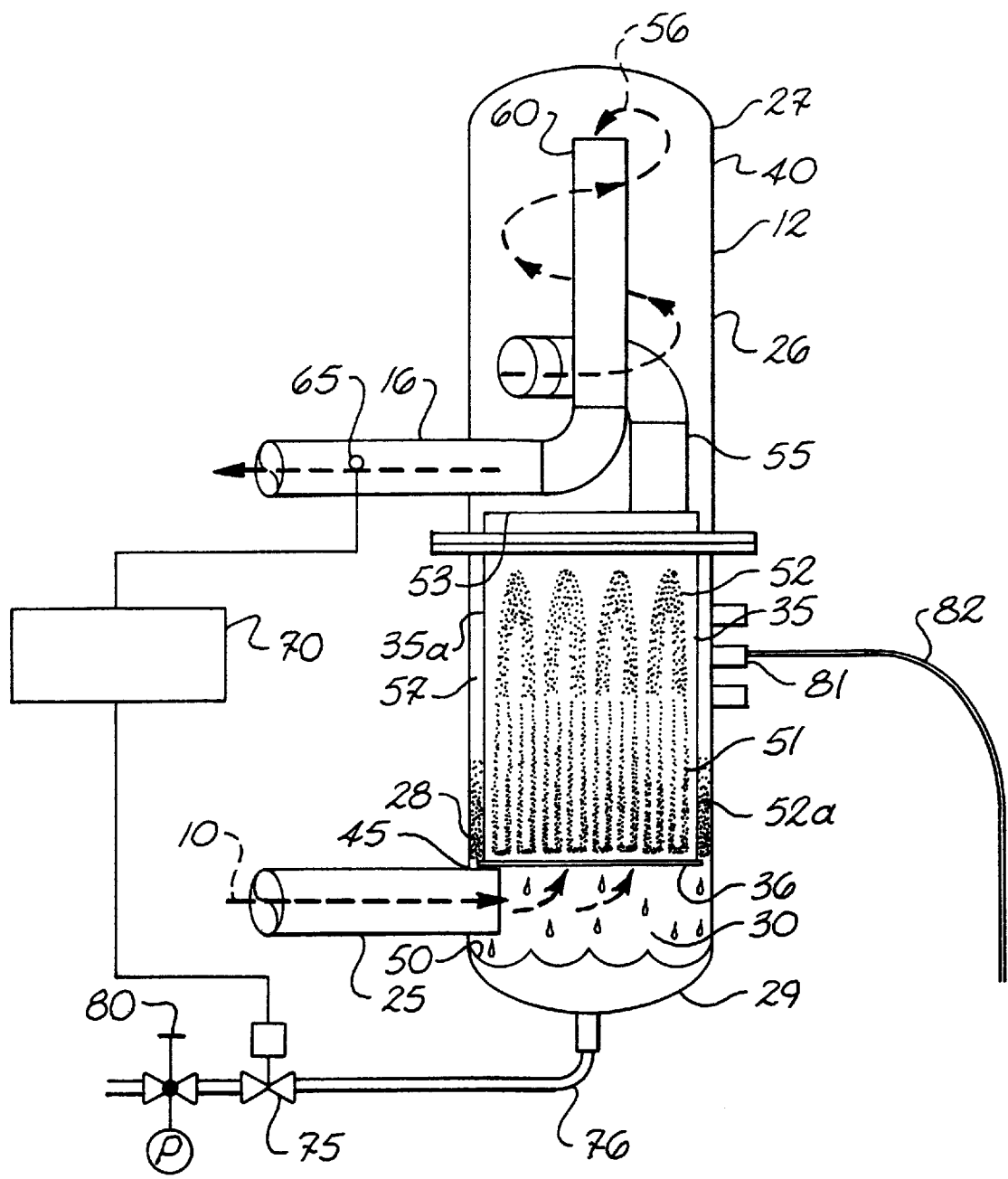
FIG. 6 is a longitudinal sectional view of the apparatus taken along lines 6—6 of FIG. 5.

Referring now to FIGS. 1, 5 and 6, the aftercooler 12 is shown in more detail. The aftercooler 12 consists of a two-part pressure vessel 26 having a top half 27 and a bottom half 28. The discharge tube 11 of the turbocharger 3 is connected to the aftercooler's inlet air tube 25. The inlet air tube 25 is located at the lower end 29 of the bottom half 28 of the aftercooler 12. The vessel 26 is also shown to have three chambers: a primary air saturation chamber 30, a secondary air saturation chamber 35 and a drying chamber 40. The primary air saturation chamber 30 and the secondary air chamber 35 are located in the bottom half 28 of the vessel 26. The drying chamber 40 is located in the top half 27 of the vessel 26.

The secondary air saturation chamber 35 has a closed end cylinder 35a that is located immediately above the primary air saturation chamber 30 and is held in place by fasteners. At the bottom of the closed end cylinder 35a is a diffusion screen 36. The closed end cylinder 35a is positioned above the primary air chamber 30 such that the diffusion screen 36 is directly above the entry way 45 of the inlet tube 25.

In operation, the compressed, heated air 10 enters the vessel 26 through the inlet air tube 25 into the primary air saturation chamber 30. The primary air saturation chamber 30 has a layer of water 50 located in the lower end 29 of the bottom half 28. The water 50 with the incoming compressed, heated air 10 causes a tremendous air-water turbulence which leads to some of the water 50 to evaporate thereby causing the compressed, heated air 10 to cool to form semi-cooled compressed air 51. The diffusion screen 36 while allowing the semi-cooled compressed air 51 to enter into the secondary air saturation chamber 35 divides the semi-cooled compressed air 51 into separate flows of air where intense bubbling and foaming increases the air-water contact. The additional air-water contact further cools the semi-cooled compressed air 51 to form an air-water mixture 52 that approaches the temperature and moisture level of saturation.

Located at the top end 53 of the closed end cylinder 35a is a tangential outlet tube 55 that allows the air-water mixture 52 to exit the secondary air saturation chamber 35 and to enter the drying chamber 40. The tangential outlet tube 55 forces the air-water mixture 52 to make a 90 degree turn before entering the drying chamber 40. The 90 degree turn causes the air-water mixture 52 to circulate along the interior walls of the drying chamber 40. Due to the resulting centrifugal force most of the mist 52a in the air-water mixture 52 is separated from the air-water mixture 52, thereby forming moist compressed air 56. The mist 52a is allowed to drain back into the primary saturation chamber 29 through the use of return water passages 57.

As shown in FIGS. 1, 5 and 6, the moist compressed air 56 proceeds further up into the drying chamber 40 until it makes an abrupt 180 degree turn as it enters the outlet air tube 60 which directs the moist compressed air 56 out of the aftercooler 12, through the air tube 16 and into the engine intake manifold 15. The last reversal created by the abrupt 180 degree turn works to ensure that any unevaporated water not previously separated in the primary drying chamber 40 will be separated from the moist compressed air 56. As the moist compressed air 56 is flowing through the air tube 16, the moist compressed air 56 passes a temperature sensor 65 that provides air temperature data to a process control computer 70. The computer 70 is electrically connected to an injection water solenoid valve 75 located in a water inlet port 76 that provides water to the primary air saturation chamber 29. The computer 70 is programmed to cycle the injection water solenoid valve 75 based on the air temperature data provided by the temperature sensor 65. The computer 70 also is programmed to activate an alarm if the air temperature data of the moist compressed air 56 is too high or falls too low, thereby indicating a malfunction of the aftercooler 12 which could potentially damage the engine 1.

The water inlet port 76 is also shown to have a water pressure regulator 80 that has a gauge. The water pressure regulator 80 is modulated to maintain the desired pressure in the make-up of the water 50 in the primary saturation chamber 29. The desired quality of the water 50 is further maintained by the use of water bleed down ports 81. The water bleed down ports 81 are located on the exterior wall of the bottom half of the vessel and allow a portion of the mist 52a draining from the drying chamber 40 to flow out of the vessel through the water bleed down ports 81. The desired make-up of the water 50 is important because any dissolved solids in the water 50 become concentrated as the evaporation process takes place. Thus, the amount of solids in the water 50 is regulated by the water bleed down ports 81. The rate of the flow through the water bleed down ports 81 is in turn regulated by the size of the hose 82 that is connected to the water bleed down ports 81 and the location of the bleed down ports 81 along the exterior wall of the bottom half of the vessel 26. Note, however, that the water inlet port 76 which provides the water 50 to the primary air saturation chamber 29 does not have to have a treatment system to first treat the incoming water, nor does the incoming water have to be pretreated.

Thus, the aftercooler 12 can function as a NOx reducing aftercooler using water 50 as a coolant with water 50 having high levels of dissolved solids. The quantity of the water 50 required for the aftercooler 12 to function properly is approximately equivalent to 20 to 25 percent of the volume of water required if after-treatment NOx devices were used. With the present invention, the use of the water bleed down ports 81, along with the computer 70, work to provide and maintain the desired quality of the make-up of the water 50 to provide the moist compressed air 55 for the engine 1. The resulting use of the aftercooler 12 provides that a much less water volume level is required and consumed for the aftercooler 12 to operate and aid in the reduction in the formation of NOx emissions.

Additionally, the aftercooler 12 can be used with industrial waste waters that contain specific volatiles in limited concentrations. The volatiles in the industrial waste waters will be destroyed during the combustion process after the waste waters have been used to form the moist compressed air 56 for the engine 1. Examples of such waste waters include water contaminated with small quantities of gasoline or diesel fuel.

Further, the aftercooler 12 can be used to concentrate and recover various products from industrial waste waters or low concentration industrial product streams that contain commercially valuable substances in concentration too low to otherwise be valuable. The aftercooler 12 can operate to concentrate these substances to a level where further recovery is economically viable. Examples include water contaminated by small quantities of glycol or antifreeze.

The aftercooler 12 can also be used in conjunction with exhaust gas recirculation systems to further reduce the formation of NOx emissions during a combustion process. In this application, a small amount of combustion gas is intentionally mixed with the incoming air stream 6 to provide a more non-reactive mass in the combustion mixture and thereby further reduce the formation of NOx emissions.

SUMMARY

The aftercooler 12 receives compressed, heated air 10 from a turbocharger 3 that is connected to a reciprocating engine 1. The aftercooler 12 consists of a two-part pressure vessel 26, with the top half 27 of the vessel 26 containing the drying chamber 40 and the bottom half 28 containing the primary air saturation chamber 30 and the secondary air saturation chamber 35. The compressed, heated air 10 first enters the aftercooler 12 through the inlet air tube 25 and into the primary air saturation chamber 30. The primary air saturation chamber 30 has a layer of water 50 that with the incoming compressed, heated air 10 causes an air-water turbulence to occur which leads to some of the water 50 being evaporated, thereby causing the air 10 to cool and form a semi-cooled compressed air 51. A diffusion screen 36 is located above the primary air saturation chamber 30 and allows the semi-cooled compressed air 51 to exit the primary air saturation chamber 30 and to enter the secondary air saturation chamber 35, where bubbling and foaming increases the air-water contact. This additional air-water contact further cools the semi-cooled compressed air 51 and forms an air-water mixture 52 that approaches the temperature and moisture level of saturation.

The air-water mixture 52 exits the secondary air saturation chamber 35 through a tangential outlet tube 55, which directs the air-water mixture 52 to enter the drying chamber 40. The tangential outlet tube 55 forces the air-water mixture 52 to make a 90 degree turn before entering the drying chamber 40. The 90 degree turn causes the air-water mixture 52 from the tube to circulate along the interior walls of the drying chamber 40, which results in centrifugal force acting to separate the mist 52a from the air-water mixture 52, thereby forming moist compressed air 56. The separated mist 52a is allowed to drain back into the primary saturation chamber 29 through the use of water return passages 57.

The moist compressed air 56 circulates further up into the drying chamber 40 until is makes an abrupt 180 degree turn into an outlet air tube 60 which directs the moist compressed air 56 out of the aftercooler 12 through the air tube 16 and into the engine air intake manifold 15. The last reversal created by the abrupt 180 degree helps to separate any unevaporated water from the moist compressed air 56. As the moist compressed air 56 enters the engine intake manifold 15, it is directed inside the engine 1 where the moisture in the moist compressed air 56 acts to reduce the NOx formation during the combustion process in the engine 1. The exhaust gas 5 from the engine 1 is collected in the exhaust manifold 4 and directed to the compressor 8 of the turbocharger 3, which uses the energy in the exhaust gas 5 to drive the turbocharger 3.

It is to be understood that while certain forms of this invention have been illustrated and described, the invention is not limited thereto, except insofar as such limitations are included in the following claims.

What is claimed and described to be secured by Letters Patent is as follows:

1. A system for reducing the formation of nitrogen oxides during the combustion process in a turbocharged engine, said engine having an intake manifold and a turbocharger for supplying compressed air to said intake manifold, said system comprising:

a. an aftercooler apparatus disposed between said turbocharger and said intake manifold and being in fluid communication with said turbocharger and said intake manifold, said aftercooler apparatus having a body including a water inlet and an outlet, said body forming a saturation chamber and a drying chamber in communication with said outlet, said aftercooler apparatus further including a partition disposed within said body for separating said saturation chamber from said drying chamber, said water inlet being in communication with said saturation chamber, said partition including a tangential tube mounted therein in communication with said drying chamber and said saturation chamber; a temperature sensor disposed within said outlet in temperature sensing communication with said intake manifold; means for increasing moisture within said compressed air to form moist compressed air, said means for increasing moisture within said compressed air being disposed within said saturation chamber; and means for producing an air-water mixture having a temperature and moisture level approximate to that of saturation disposed within said body in fluid communication with said tangential tube and said outlet, and wherein said outlet delivers said air-water mixture to said intake manifold; and b. wherein said turbocharger of said engine includes a compressor and an air outlet in communication with said saturation chamber of said aftercooler apparatus for delivering said compressed air to said saturation chamber; and c. wherein said air-water mixture is effective to reduce said formation of said nitrogen oxides during said combustion process.

2. The system as set forth in claim 1 wherein said water inlet is connected to a water source having dissolved solids, and said means for increasing moisture within said compressed air has a means for using said water source as a coolant.

3. The system as set forth in claim 1 wherein said aftercooler apparatus has a means for using industrial waste waters that contain volatile contaminants as a coolant for said means for increasing moisture within said compressed air.

4. The system as set forth in claim 3 wherein said aftercooler apparatus has a means for concentrating and recovering said contaminants from said industrial waste waters.

5. The system as set forth in claim 1 wherein an exhaust gas recirculation system is used with said aftercooler apparatus as a means for further reducing the formation of said nitrogen oxides.

6. The system as set forth in claim 1 wherein said aftercooler apparatus is electrically connected to a computer having a means for determining the temperature of said moist compressed air and a means for regulating the flow of water to said water inlet depending upon said temperature of said moist compressed air.

7. An apparatus for reducing the formation of nitrogen oxides during the combustion process in a turbocharged engine, having an intake manifold, said apparatus comprising:

a. a hollow vessel having top and bottom sections, said top and bottom sections having interior walls;

b. a closed end cylinder disposed within said vessel, said closed end cylinder having a tangential outlet tube that is in communication with said top section;

c. a diffusion barrier disposed within said bottom section and dividing the interior of said bottom section into upper and lower air saturation chambers;

d. a drain passage located adjacent to said interior walls and extending from said top section into said bottom section, said drain passage in said bottom section being located between said interior walls and said closed end cylinder;

e. an external outlet in communication with said drain passage;

f. a water inlet tube and an air inlet tube connected to said lower air saturation chamber through which water and compressed air, respectively, can enter said vessel;

g. an outflow tube having an opening disposed within said top section and a discharge chute connected to said air intake manifold;

h. wherein, said water and said compressed air enter said lower air saturation chamber and mix together to form semi-cooled compressed air that is directed through said diffusion barrier into said upper air saturation chamber, said diffusion barrier having means to further mix said semi-cooled compressed air thereby increasing air-water contact and forming an air-water mixture having a high saturation level, said air-water mixture directed into said top section through said tangential outlet tube and circulated along said interior walls to form moist compressed air, said moist compressed air directed to said opening of said outflow tube and into said intake manifold through said discharge chute, said moist compressed air is effective to reduce the formation of said nitrogen oxides during the combustion process in said engine, and said circulation along said interior walls having a means for separating liquids from said air-water mixture which flow through said drain passage.

8. The apparatus as set forth in claim 7 wherein said bottom section of said apparatus is in communication with said turbocharger of said engine, said turbocharger having means for directing said compressed air to said lower air saturation chamber through said air inlet.

9. The apparatus as set forth in claim 7 wherein said water inlet is connected to an industrial waste water source that contains contaminants, said apparatus having a means for using said industrial waste water source as a coolant means for forming said semi-cooled compressed air and for increasing said air-water contact for forming said air-water mixture.

10. The apparatus as set forth in claim 7 wherein said water inlet being connected to a water source having dissolved solids, said apparatus having a means for using said water source as a coolant means for forming said semi-cooled compressed air and for increasing said air-water contact for forming said air-water mixture.

11. The apparatus as set forth in claim 7 wherein said drain passage having a means for concentrating and recovering substances from said water.

12. The apparatus as set forth in claim 7 wherein said apparatus is connected to an exhaust gas recirculation system, said apparatus and said exhaust gas recirculation system having means for providing additional reduction of the formation of said nitrogen oxides.

13. The apparatus as set forth in claim 7 wherein said apparatus is electrically connected to a computer having a means for determining the temperature of said moist compressed air and a means for regulating the flow of water to said water inlet depending upon said temperature of said moist compressed air.

14. The apparatus as set forth in claim 7 wherein said external outlet has a means for draining liquids from said drain passage.

15. An apparatus for reducing the formation of nitrogen oxides during the combustion process in a turbocharged engine, having an air intake manifold, said apparatus comprising:

a. a hollow vessel having top and bottom sections, said top and bottom sections having interior walls;

b. a closed end cylinder disposed within said vessel, said closed end cylinder having an outlet connected to a tangential outlet tube that is in communication with said top section;

c. a diffusion barrier disposed within said bottom section and dividing the interior of said bottom section into upper and lower air saturation chambers;

d. a drain passage located adjacent to said interior walls and extending from said top section into said bottom section, said drain passage in said bottom section being located between said interior walls and said closed end cylinder, said drain passage being connected to an external outlet located in said bottom section;

e. a water inlet tube and an inlet air tube connected to said lower air saturation chamber through which water and compressed air, respectively, can enter said vessel; and f. an outflow tube having an opening and a center section disposed within said top section and a discharge chute in communication with said air intake manifold, said center section making a turn in said top section prior to said discharge chute being connected to said air intake manifold;

g. wherein, said water and said compressed air enter said lower air saturation chamber and mix together to form semi-cooled compressed air that is directed through said diffusion barrier into said upper air saturation chamber, said diffusion barrier having means to further mix said semi-cooled compressed air thereby increasing air-water contact and forming an air-water mixture having a high saturation level, said air-water mixture directed into said top section through said outlet in said top plate and said tangential outlet tube and circulated along said interior walls to form moist compressed air, said moist compressed air directed to said outflow tube and into said intake manifold of said engine, said moist compressed air is effective to reduce the formation of said nitrogen oxides during the combustion process in said engine, and said circulation of said air-water mixture along said interior walls having means for separating liquids from said air-water mixture which flow through said drain passage.

16. The apparatus as set forth in claim 15 wherein said bottom section of said apparatus is in communication with said turbocharger of said engine, said turbocharger having means for directing said compressed air to said lower air saturation chamber through said air inlet.

17. The apparatus as set forth in claim 15 wherein said water inlet is connected to an industrial waste water source that contains volatile contaminants, said apparatus using said industrial waste water source as a coolant means for forming said semi-cooled compressed air and for increasing said air-water contact for forming said air-water mixture.

18. The apparatus as set forth in claim 15 wherein said water inlet is connected to a water source having dissolved solids, said apparatus using said water source as a coolant means for forming said semi-cooled compressed air and for increasing said air-water contact for forming said air-water mixture.

19. The apparatus as set forth in claim 15 wherein said drain passage has a means for concentrating and recovering substances from said water.

20. The apparatus as set forth in claim 16 wherein said apparatus is connected to an exhaust gas recirculation system that together provide a means for additional reduction of the formation of said nitrogen oxides, and said apparatus is electrically connected to a computer having means for determining the temperature of said moist compressed air and a means for regulating the flow of water to said water inlet depending upon said temperature of said moist compressed air.

21. The apparatus as set forth in claim 20 wherein said means for determining the temperature of said moist compressed air includes a temperature sensor that provides air temperature data to said computer, said means for regulating the flow of water includes a solenoid valve connected to said computer and said water inlet, and said solenoid valve cycling through an open and a closed position depending upon said air temperature data.

* * * * *